Aug. 28, 1951   L. E. ENDSLEY ET AL   2,566,083
CONTROL DEVICE FOR ENGINE FUEL SYSTEMS
Original Filed April 1, 1946   2 Sheets-Sheet 1

INVENTORS
LOUIS E. ENDSLEY
JAMES E. JUSTUS
BY Paul L. Kirsten
ATTORNEY

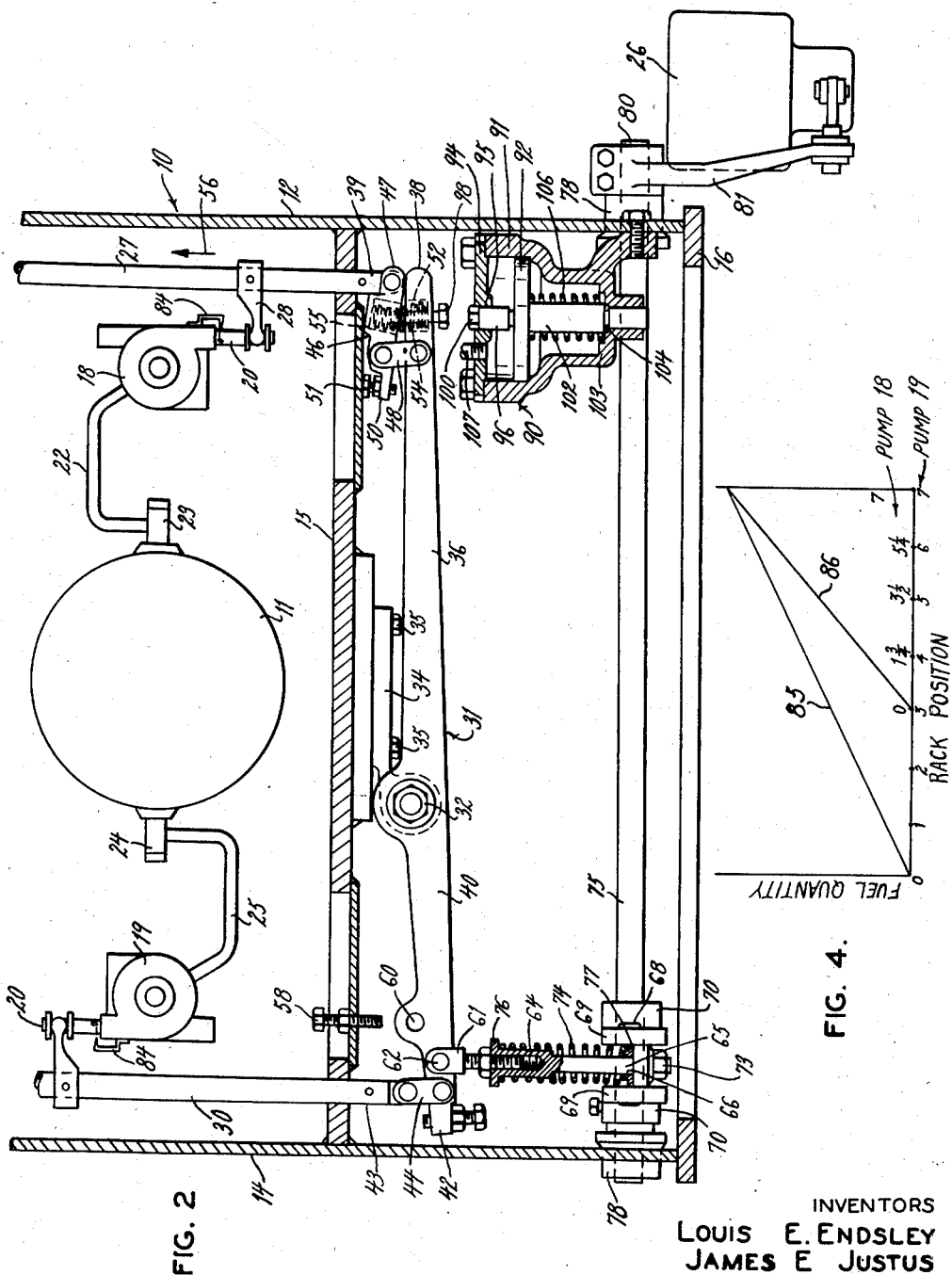

Patented Aug. 28, 1951

2,566,083

UNITED STATES PATENT OFFICE 2,566,083

CONTROL DEVICE FOR ENGINE FUEL SYSTEMS

Louis E. Endsley, Pittsburgh, Pa., and James E. Justus, Beloit, Wis., assignors to Fairbanks, Morse & Co., Chicago, Ill., a corporation of Illinois Original application April 1, 1946, Serial No. 658,674. Divided and this application May 16, 1949, Serial No. 93,452

1 Claim. (Cl. 123—198)

This invention relates to improvements in the fueling of internal combustion engines, and has particular reference to improved control mechanism for the fuel delivery apparatus of engines such as diesel engines of the opposed piston type. The present application is a division of application Serial No. 658,674, filed April 1, 1946, and entitled Engine Fuel Control Means, said application now being Patent No. 2,496,458.

It is well known in diesel engine practice and particularly in the instance of opposed piston diesels, to employ for the purpose of improved combustion efficiency, two or more fuel injectors in each cylinder arranged as in diametrical or other suitably spaced relation to afford a uniform and more effective fuel distribution in the cylinder combustion space. However, in connection with fuel systems utilizing airless or solid fuel injectors of well-known or prevailing construction, it has been found in practice that during engine operation under no load, idling speed and sometimes under light load conditions with engine speed only slightly above idling, fuel delivery through the injectors tends to be in excess of that quantity necessary merely to maintain engine idling or low speed operation. Where the engine is employed as a prime mover for railway locomotives, as switch and transfer locomotives in particular, frequent and many times relatively long periods of engine operation at idling or low speed, are encountered in normal locomotive use, so that the problem of excess fuel consumption or fuel wastage during idling in particular, is of major importance in diesel locomotive practice. In fact, if not prevented, the excess fuel not consumed in the normal combustion process at idling or low speeds, ultimately will leak past the pistons into the engine crankcase and there mix with the lubrication oil with consequent dilution of the latter to a more or less serious degree. In time, the accumulation of fuel oil in the crankcase may reach proportions dangerous for obvious reasons, to further engine operation. Accordingly, it is a principal purpose of the present invention to provide in operative association with the fueling apparatus of a diesel engine of opposed piston type in particular, employing two or more fuel injectors in each cylinder thereof, control means of a novel and effective character, for regulating engine fueling in a manner such as will avoid the condition above expressed.

Stated more particularly, the present improvements afford an engine governor responsive control mechanism for regulating fuel pump delivery to the injectors of the cylinders such that during no load, idling or light load, low speed operations of the engine, fuel will be delivered through less than all of the injectors, as only one injector in each cylinder, and in quantity sufficient merely to continue idling or low speed operation. Under load operation of the engine, the control mechanism functions in response to governor action, to determine pump fuel delivery to all of the injectors, and to effect at least at full load, an equal fuel quantity injection by the injectors in each cylinder.

Another object of the present invention is to embody in a fuel delivery control mechanism for the purpose indicated, means for actuating the control in the event of failure of normal oil pressure in the engine lubricating system, to cause an immediate reduction in fuel pump delivery such as will stop further operation of the engine.

The foregoing and other objects will appear readily from the following description of a presently preferred embodiment of the invention as exemplified in the accompanying drawing, wherein:

Fig. 2 is a view similar to that of Fig. 1, but illustrating the control mechanism in the position of no-fuel delivery adjustment of the fuel pumps;

Fig. 4 illustrates graphically, fuel quantity delivery by the opposite pumps corresponding to rack positions, and indicates the relative positions of the racks throughout engine operation.

Figures 1, 3:
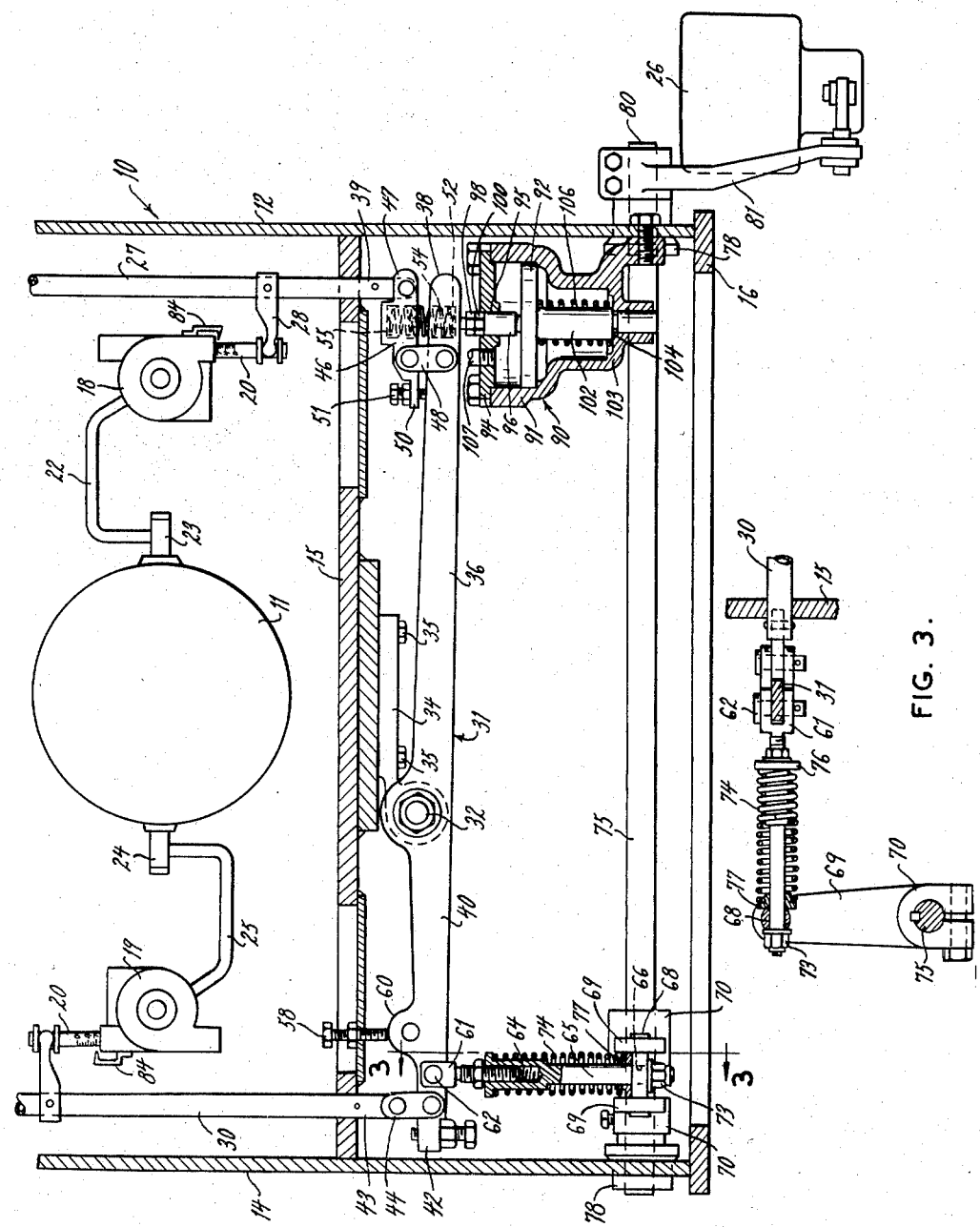
Fig. 1 is a fragmentary horizontal section of an engine embodying the present improvements, the view showing one cylinder, injectors and fuel pumps in diagrammatic elevation.
Fig. 3 is a detail view of a part of the governor operated mechanism, as taken along the line 3—3 in Fig. 1.

In the drawing there are shown in somewhat diagrammatic manner, only such parts of a diesel engine of an opposed piston type, which are considered essential or desirable to a full understanding of the present invention. The engine frame 10 adapted for the support of the cylinders, one of which is shown at 11, includes opposite side walls 12 and 14 and transverse frame members two of which appear at 15 and 16. Arranged in suitable position on opposite sides of the cylinder 11 are fuel pumps 18 and 19, which may be alike and of any well known construction. By present preference, the pumps are of reciprocating plunger type, each driven by the engine as through a camshaft (not shown) and regulatable as to fuel quantity delivery by angular adjustment of its plunger through a rack control element indicated at 20. Fuel delivery is effected from pump 18 through a conduit 22 to an air-less injection valve 23 in the cylinder 11, for injection to the cylinder combustion space. In like manner, the pump 19 delivers through a conduit 25 to an injection valve 24 located in the cylinder preferably diametrically opposite the injection valve 23.

While but one cylinder 11 is here shown, in engines of more than one cylinder, each cylinder will have associated therewith a like pair of fuel pumps and cylinder injectors, arranged as described for the cylinder shown. The group or bank of pumps on one longitudinal side of the engine, as on the right hand side as viewed in Fig. 1, may be regulated simultaneously as to fuel quantity output, from the engine governor indicated diagrammatically at 26, through control mechanism forming the subject of this invention and presently to be described. The rack element 20 of each pump in the bank, is suitably adjustably connected to a rod 27 by an operating link 28, as indicated for the pump 18 shown, from which it will appear that upon longitudinal displacement movements of rod 27, the rack of each pump will be actuated to adjust the pump output. The pumps in the left hand bank similarly have their rack elements 20 adjustably connected to a common control rod 30, this latter being under governor control as will appear presently.

With reference now to the control mechanism between the governor 26 and the pump rack actuating rods 27 and 30, an operating lever or rocking beam 31 is arranged horizontally along the engine frame member 15 and is pivotally supported by a pivot assembly 32 including a bracket 34 secured to the frame as by bolts 35. The lever is pivoted off-center to a predetermined extent for a purpose to appear, such that the portion 36 between the point of pivotal support and the lever end 38 adjacent the end 39 of rod 27, is of greater length than the lever portion 40 between the pivot and lever end 42 adjacent the end 43 of rod 30. Operatively connecting the lever end 42 and the end 43 of rod 30, is a link element 44 suitably pivotally secured to the rod and lever as shown. At the opposite lever end 38, the lever connection to the rod 27 is made by means permitting a limited pivotal movement or over-travel of the lever without corresponding movement of the rod 27, as for a purpose to appear. The means referred to comprises by present preference, a member 46 pinned or otherwise suitably pivotally connected at one end 47, to the end 39 of rod 27, and pivotally carried on the lever 31 by a link 48, the link being pivoted to the lever at a point inwardly adjacent the lever end 38, and to the member 46 at a point inwardly adjacent the end 50 of the latter. Carried by the end 50 of member 46 is an adjustable distance piece, shown as a cap screw 51 arranged for abutment with the lever 31. A suitable compression spring 52 having its ends seated in recesses or pockets, 54 and 55 formed respectively, in the lever 31 and member 46, serves to retain the parts in normal operative relation, as with the cap screw in abutment with the lever to afford a substantially rigid connection between the lever and rod 27 throughout normal fuel regulating operation of the mechanism. However, in the lever actuation of rod 27 in the direction as indicated by the arrow 56, to reduce the fuel output of the pump to zero fuel delivery (Fig. 2), the connection as described will function to permit positioning of the pump racks at "zero fuel" positions. Thereafter upon further lever movement in the same direction for returning the opposite bank of pumps to zero fuel condition as will be referred to hereafter, the rod 27 at such time being held against further movement by abutment of the pump racks with suitable stops (not shown), the spring 52 will yield, compressing as the end 38 of the lever 31 approaches the end 39 of rod 27, while the member 46 pivots relative to rod 27, thus allowing the desired over-travel of the lever 31 as to the position shown in Fig. 2.

Pivoting of the lever 31 in the direction to increase fuel pump output, may be adjustably limited say to a position determining full load pump delivery, by a stop element or cap screw 58 in the frame 15, positioned for abutment by a projection 60 on the lever.

Governor connection to lever 31 preferably is made at the lever end 42, and comprises a yoke member 61 pinned to the lever at 62 and adjustably threaded lengthwise into one end of a bar 64. The opposite end 65 of bar 64 is freely projected through an aperture 66 transversely through the central part of a pivot pin 68, the latter being supported at its ends in spaced arms 69 forming a lever the hub portion 70 of which (Fig. 3) is suitably secured or keyed upon one end of a shaft 75. A nut and washer 73 on the free end of bar 64 when in abutment with pin 68, determines a positive actuating connection serving in one direction of rotation of shaft 72, to produce pivotal displacement of the lever 31. Pivotal movement of the lever in the opposite direction by shaft rotation opposite to that mentioned, is here effected, however, through a yieldable element comprising a compression spring 74 bearing between a cap flange 76 on the bar 64 and a flanged washer 77, the latter abutting the pin 68.

Shaft 75 is suitably rotably journalled by bearings 78 in the opposite frame sides 12 and 14, and projects at 80 for connection by a lever 81, to the governor 26. Thus the lever system as now described, is under direct control of the governor, for determining fuel delivery regulation of the several fuel pumps in a manner now to be fully pointed out.

Before proceeding with the operation, it is to be noted that the rack element 20 of each pump is provided with graduations arranged longitudinally over an exposed surface thereof and numbered from zero to seven (Fig. 1), while a pointer 84 fixed to the pump frame is associated with the graduations as shown. The pump assembly is adjusted such that when the rack 20 is positioned to register the zero graduation with the pointer, the pump plunger will be thereby conditioned for no-fuel delivery to the injector, and further such that for example when the rack is actuated to register graduation No. 3 with the pointer 84, the pump plunger thereby rotated to an extent corresponding to the rack displacement from zero to the No. 3 graduation, will be conditioned for fuel delivery through the associated injector in quantity sufficient merely to maintain engine operation at no-load, or at most, under a minimum load, low speed condition. Continued rack displacement such as to register graduation No. 7 for example, with the pointer 84, thereby conditions the pump for full-load fuel delivery.

Turning now to the operation of the system, when the engine is not in operation, the mechanism is positioned (Fig. 2) as determined by the inactive position of the governor 26, to dispose the control rod 30 such as to locate the racks 20 of the left hand bank of fuel pumps, to register the zero graduation of each with the associated pointer 84. Similarly, the racks 20 of the right hand bank of fuel pumps will be positioned through rod 27, to register the zero graduation of each with the associated pointer 84, the yieldable connection between the rod 27 and the pivot bar or lever 31, as constituted by the elements 46, 48 and spring 52, being at this time in what may be called a collapsed condition such that with the lever end 38 relatively closely adjacent the end 39 of rod 27, the member 46 will be pivotally displaced relative to lever 31 to a position wherein the stop element 51 is out of engagement with the lever 31, as appears in Fig. 2. Now upon starting of the engine and adjustment of the governor 26 in a well known manner, to determine for example, normal no-load idling of the engine, the lever 31 will be pivotally actuated by the governor through the shaft 75 and the described operating connection between the shaft and lever 31, to displace the control rod 30 sufficiently to cause actuation of the pump racks 20 in the left hand pump bank, to register graduations No. 3 with the fixed pointers. Pivoting of the lever 31 to this extent however, does not effect movement of rod 27 and the connected racks of the right hand bank of fuel pumps, from the initial no-fuel delivery positions of these elements, because as the end 38 of the lever moves away from the end 39 of the rod 27, the member 46 pivots about its connection to rod 27 until the stop element 51 engages the lever 31, the latter obtaining (according to adjustment of the stop 51) when the lever 31 is in the position to determine the aforementioned idling fuel delivery by the left hand bank of pumps. During this phase of lever displacement, the spring 52 is expanding from its initial compressed condition, the spring reacting on the rod 27 through member 46 to prevent rod displacement as the lever pivots, until the stop 51 contacts the lever. Thereafter, when the lever is pivoted beyond the idling position as to determine load operation of the engine, the described connection between the lever and rod 27 affords positive displacement of rod 27 by the lever.

Now as the governor 26 is further regulated as for full load, full speed operation of the engine for example, the lever 31 in response to governor actuation thereof, is pivoted in the direction to displace rod 30 to an extent such as to register the No. 7 graduation of each pump rack in the left hand pump bank, with the associated pointer 84 (Fig. 1). In this instance, rod 30 is moved from the idling position wherein the No. 3 graduation of each pump rack 20 is in register with its pointer. As this takes place, the lever also actuates the rod 27 in the direction to cause fuel delivery operation of the right hand bank of pumps. Since the portion 36 of lever 31 which is connected to rod 27, is the longer arm of the lever, the resulting displacement of rod 27 will be greater than that of rod 30. In the present example, the relative lengths of the lever arms 36 and 40 is predetermined, as by proper location of the off-center pivot 32 along the lever 31, so that the rate of rack advance in the right hand bank of pumps, occurring between idling and ful speed operation of the engine, is greater than that in the left hand bank of pumps to an extent such that in the full load, full speed operation, both banks of pumps will be conditioned for equal fuel delivery to the injectors. The No. 7 graduation of the rack element 20 of each pump in each bank then will be in registry with its pointer 84. Consequently, under full load the fuel injection at each cylinder will be equally divided between the two injectors therein. The foregoing is illustrated by Fig. 4, wherein the fuel quantity delivery by pump 19 varies with rack position substantially in accordance with the graph line 85, while the graph line 86 indicates the same with respect to the pump 18, but shows the greater rate of change of rack position of the latter pump in respect to that of pump 19. From the graph, it appears that at engine idling, the rack of pump 19 is at position 3, while the rack of pump 18 is at zero setting. Thus fuel delivery to the cylinder obtains only through the pump 19 and connected injector 24, and in quantity sufficient merely to maintain engine idling. Beyond idling as under load operation of the engine, both pumps are in operation with relative fuel quantity delivery in accordance with the graph lines, up to full load fuel delivery when the pumps deliver equal quantities of fuel.

It will be appreciated now that the present improvements afford a governor responsive fuel control mechanism which is operative to determine fuel delivery through only one injector in each cylinder at engine idling or low speed operation. The arrangement thus enables the most efficient operation of the fueling means at idling for example, precluding the admission of more fuel than is necessary merely to maintain the engine in operation under idling condition, thereby avoiding fuel wastage and crankcase lubricating oil dilution by fuel oil, as would otherwise occur. Above idling, the mechanism determines in accordance with governor setting, fuel delivery through all of the cylinder injectors, and effects at least at full load operation of the engine, equal quantity fuel injection at the injectors in each cylinder.

In the present embodiment of the invention, there is provided a safety device effective to cause a reduction in or stoppage of fuel delivery by the pumps in the event of abnormally low oil pressure or pressure failure in the engine lubricating system. As presently preferred and shown somewhat diagrammatically, the device indicated generally at 90 and effective through the lever 31, comprises a cylinder 91 suitably mounted on the engine frame member 12, adjacent the end 38 of lever 31, and a piston member 92 operable therein. The cylinder head or cap 94 is centrally apertured at 95 to accommodate a shaft-like element 96 projecting therethrough, the element 96 being carried by the piston 92 and serving as a piston guide as well as the lever contact element of the device. A cap screw or the like 98, adjustably carried on the lever 31, is positioned for engagement by the exposed end 100 of element 96 upon piston actuation as will be presently described. A shaft-like extension 102 from the opposite side of piston 92, is extended through the end portion 103 of the cylinder 91 and cooperates with element 96 to constrain the piston 92 to a straight-line displacement in the cylinder. Extension 102 also affords a shoulder 104 which in engagement with the cylinder end 103, determines the inactive position of the piston. The piston is biased in the direction to engage the element 96 with the lever cap screw 98, by a suitable compression spring 106 arranged as shown, but normally is retained in the inactive position shown (with the spring under compression) by lubricating oil under pressure admitted to the cylinder 91 through a conduit 107 leading from any suitable point in the engine lubricating oil delivery system (not shown).

Upon failure of normal pressure in the lubricating system, the spring 106 then will act to displace the position 92 such as to engage the piston-carried element 96 with the cap screw 98 on lever 31, thereby pivoting the lever in the direction to produce displacement of the rods 27 and 30 such as to actuate the racks of the several fuel pumps in the direction to cause fuel-delivery reduction or cessation at the pumps. The engine thus will stop, and since the safety device will hold the lever against fuel-increasing displacement until the piston 92 is retracted by normal lube oil pressure, the engine cannot be operated again until the cause of lube oil pressure failure is ascertained and corrected. It is to be noted here that the engine shutdown operation of the device 90 as effected through the lever 31, is independent of the governor control of lever 31, this being facilitated by the yieldable connection between the governor actuated shaft 72 and the lever 31, as afforded by the spring 74.

Having now shown and described the invention as to a presently preferred embodiment thereof, what we desire to claim by Letters Patent is:

In combination with an internal combustion engine providing a cylinder, at least two fuel admission valves for said cylinder, a fuel supply pump individual to each of said valves and including a control element operable to determine the fuel output of each pump, a pressure lubricating system, a pivotally supported control lever providing a short arm and a long arm, means connecting said short arm to the control element of one pump, means including a lost-motion device connecting the long arm to the control element of the other pump, governor means supported on said engine, a linkage connected between the outer free end of said short arm and said governor, a spring in said linkage transmitting the movement of said governor to said short arm to pivot said control lever in one direction for increasing fuel delivery to said engine, and an emergency shut down means responsive to pressure failure in said lubricating system and mounted on said engine directly below the outer free end of said long arm and movable thereagainst to pivot said control lever in an opposite direction against the resistance of said spring.

LOUIS E. ENDSLEY.
JAMES E. JUSTUS.

REFERENCES CITED

The following references are of record in the file of this patent:

UNITED STATES PATENTS

| Number | Name | Date |
|---|---|---|
| 1,170,200 | VerPlanck | Feb. 1, 1916 |
| 1,473,303 | Lightford | Nov. 6, 1923 |
| 2,010,420 | Simmen | Aug. 6, 1935 |
| 2,010,960 | Pogue | Aug. 13, 1935 |
| 2,197,743 | Crafts et al. | Apr. 16, 1940 |
| 2,225,234 | Schettler | Dec. 17, 1940 |
| 2,496,458 | Endsley et al. | Feb. 7, 1950 |